US011119627B2

(12) United States Patent
Li

(10) Patent No.: US 11,119,627 B2
(45) Date of Patent: Sep. 14, 2021

(54) INFORMATION DISPLAY METHOD, DEVICE, APPARATUS AND STORAGE MEDIUM

(71) Applicant: QILIN HESHENG NETWORK TECHNOLOGY INC., Haidian District Beijing (CN)

(72) Inventor: Tao Li, Haidian District Beijing (CN)

(73) Assignee: QILIN HESHENG NETWORK TECHNOLOGY INC., Haidian District Beijing (CN)

(*) Notice: Subject to any disclaimer, the term of this patent is extended or adjusted under 35 U.S.C. 154(b) by 162 days.

(21) Appl. No.: 16/470,379

(22) PCT Filed: Oct. 24, 2018

(86) PCT No.: PCT/CN2018/111664
§ 371 (c)(1),
(2) Date: Jun. 17, 2019

(87) PCT Pub. No.: WO2019/100892
PCT Pub. Date: May 31, 2019

(65) Prior Publication Data
US 2019/0310764 A1    Oct. 10, 2019

(30) Foreign Application Priority Data
Nov. 23, 2017  (CN) .......................... 201711183235.9

(51) Int. Cl.
*G06F 3/0481* (2013.01)
*G06F 3/0482* (2013.01)
*G06F 3/0484* (2013.01)
*G06F 3/0488* (2013.01)
(Continued)

(52) U.S. Cl.
CPC ........ *G06F 3/04817* (2013.01); *G06F 3/0482* (2013.01); *G06F 3/0485* (2013.01);
(Continued)

(58) Field of Classification Search
CPC ............. G06F 3/04817; G06F 3/04845; G06F 3/04883; G06F 3/0482; H04L 67/26; H04M 1/72586
See application file for complete search history.

(56) References Cited

U.S. PATENT DOCUMENTS

2007/0083827 A1* 4/2007 Scott ................. H04M 1/72472
715/811
2009/0305732 A1* 12/2009 Marcellino ............. H04L 51/24
455/466

(Continued)

FOREIGN PATENT DOCUMENTS

| CN | 104063131 A | 9/2014 |
| CN | 104504022 A | 4/2015 |

(Continued)

OTHER PUBLICATIONS

International Search Report in international application No. PCT/CN2018/111664 and an English-language version thereof.
(Continued)

*Primary Examiner* — William L Bashore
*Assistant Examiner* — Gregory A Distefano
(74) *Attorney, Agent, or Firm* — Ladas & Parry LLP

(57) ABSTRACT

An information display method, a device, an apparatus, and a storage medium are provided. The method includes: acquiring, respectively, a push information of each application in an application classification folder on a desktop of the mobile terminal; determining, respectively, according to a weight corresponding to the application to which each piece of the push information belongs and a heat corresponding to each piece of the push information, an arrangement order of each piece of the push information when displayed; determining an information push area in the application classification folder according to a triggering operation after the triggering operation of a user in the application classification (Continued)

folder has been monitored; and displaying each piece of the push information in the information push area according to the determined arrangement order.

17 Claims, 13 Drawing Sheets

(51) Int. Cl.
| | |
|---|---|
| *H04L 29/08* | (2006.01) |
| *G06F 3/0485* | (2013.01) |
| *H04M 1/7243* | (2021.01) |
| *H04M 1/72472* | (2021.01) |

(52) U.S. Cl.
CPC ........ *G06F 3/0488* (2013.01); *G06F 3/04845* (2013.01); *G06F 3/04883* (2013.01); *H04L 67/26* (2013.01); *H04M 1/7243* (2021.01); *H04M 1/72472* (2021.01); *H04M 2250/22* (2013.01)

(56) References Cited

U.S. PATENT DOCUMENTS

| | | | | |
|---|---|---|---|---|
| 2012/0323933 A1* | 12/2012 | He | ........................ | H04L 51/24 |
| | | | | 707/749 |
| 2013/0293590 A1* | 11/2013 | Gommier | ................ | G06F 9/451 |
| | | | | 345/666 |
| 2016/0059864 A1* | 3/2016 | Feit | ........................ | B60K 35/00 |
| | | | | 701/36 |
| 2018/0232114 A1* | 8/2018 | Saunshi | ................ | G06F 3/0485 |
| 2018/0356954 A1* | 12/2018 | Hyun | .................... | G06F 3/0488 |
| 2019/0014187 A1* | 1/2019 | Choi | ........................ | H04L 67/34 |

FOREIGN PATENT DOCUMENTS

| | | |
|---|---|---|
| CN | 105989144 A | 10/2016 |
| CN | 106791153 A | 5/2017 |
| CN | 107800888 A | 3/2018 |
| EP | 2713260 A1 | 4/2014 |
| JP | 2013156885 A * | 8/2013 |

OTHER PUBLICATIONS

Written Opinion of the International Search Authority in international application number.
CN 107800888 A—Espacenet English Abstract.
CN 104504022 A—Espacenet English Abstract.
CN 104063131 A—Espacenet English Abstract.
CN 105989144 A—Espacenet English Abstract.

* cited by examiner

INFORMATION DISPLAY METHOD, DEVICE, APPARATUS AND STORAGE MEDIUM

RELATED APPLICATION

This application is an application under 35 U.S.C. 371 of International Application No. PCT/CN2018/111664 filed on 24 Oct. 2018. This application claims priority from Chinese Patent Application No. 201711183235.9 filed on 23 Nov. 2017, the contents of which should be understood to be incorporated herein by reference.

TECHNICAL FIELD

The present application relates to a field of mobile terminal technologies, and in particular, to an information display method, an information display device, an information display apparatus, and a storage medium.

BACKGROUND

With a popularization of mobile terminals (such as mobile phones, tablet computers, etc.), in order to achieve diversified services to obtain more services, more and more applications are installed on mobile terminals by users, and services, of mobile terminals are becoming more and more abundant.

In order to enable the user to know relevant information of each application in the mobile terminal in time, the mobile terminal receives and displays the push information of each application, such as receiving and displaying the current weather condition pushed by the weather application. At present, the mobile terminal arranges and displays the received push information in the information notification column of the mobile terminal mainly according to an order of receiving time of the push information.

The inventor found in the research that in the prior art the push information is arranged and displayed according to the order of receiving time of the push information, which reduces the efficiency of the user to quickly locate the push information to be viewed in the plurality of push information, and is inconvenient for the user to view the push information.

SUMMARY

The purpose of the embodiments of the present application is to provide an information display method and device, which can display in the application classification folder on the desktop of the mobile terminal the push information of the included application according to the weight of the application to which the push information belongs and the heat of the push information, thereby improving the efficiency of the user to quickly locate the push information to be viewed in the plurality of pieces of push information, and facilitating the user to view the push information.

To solve the above technical problem the embodiments of the present application are implemented as follows:

In a first aspect, the embodiments of the application provide an information display method, including:

acquiring, respectively, a push information of each application in an application classification folder on a desktop of the mobile terminal, wherein the application classification folder is used to store an icon corresponding to the application of a predetermined category in a mobile terminal;

determining, respectively, according to a weight corresponding to the application to which each piece of the push information belongs and a heat corresponding to each piece of the push information, the arrangement order of each piece of the push information when displayed, wherein the weight corresponding to the application is respectively related to a usage information and a heat information corresponding to the application;

determining an information push area in the application classification folder according to a triggering operation after the triggering operation of a user in the application classification folder has been monitored; and displaying each piece of the push information in the information push area according to the determined arrangement order.

In a second aspect, the embodiments the application provide an information display device, including:

an information acquisition module, configured to acquire, respectively, a push information of each application in an application classification folder on a desktop of a mobile terminal, wherein the application classification folder is used to store an icon corresponding to the application of a predetermined category in the mobile terminal;

a display ranking module, configured to determine, respectively, according to a weight corresponding to the application to which each piece of the push information belongs and a heat corresponding to each piece of the push information, an arrangement order of each piece of the push information when displayed, wherein the weight corresponding to the application is respectively related to a usage information and a heat information corresponding to the application;

an area determining module configured to determine an information push area in the application classification folder according to a triggering operation after the triggering operation of a user in the application classification folder has been monitored: and an information display module, configured to display each piece of the push information in the information push area according to the determined arrangement order.

By means of the information display method and the information display device in the embodiments of the present application, the information push area can be determined according to the triggering operation of the user in the application classification folder to which the push information belongs, and the push information of the application can be displayed in the information push area according to the weight of the application to which the push information belongs and the heat of the push information, thereby improving the efficiency of the user to quickly locate the push information to be viewed in multiple pieces of push information, facilitating the user to view the push information, thereby solving the problem of reducing the efficiency of the user to quickly locate the push information to be viewed in the plurality of push information in an information display manner of the prior art.

In a third aspect, the embodiments of the application provide an information display apparatus including: a memory, a processor, and a computer programs stored on the memory and operative on the processor, wherein the computer programs, when executed by the processor, implement the steps of the method mentioned above.

In a fourth aspect, the embodiments of the application provide a storage medium having stored thereon computer programs, wherein the computer programs, when executed by the processor, implement the steps of the method mentioned above.

BRIEF DESCRIPTION OF THE DRAWINGS

In order to more clearly illustrate the embodiments of the present application or the technical solutions in the prior art, the drawings used in the embodiments or the prior art description will be briefly described below. Obviously, the drawings in the following description are only a few embodiments described in the present application, and other drawings can be obtained from those drawings by a person skilled in the art without paying any inventive labor.

FIG. 2b is a schematic view of sliding operation of a user corresponding to FIG. 2a;

FIG. 2d is another schematic view of sliding operation of a user corresponding to FIG. 2a;

FIG. 3b is a schematic of a click operation of a user corresponding to FIG. 3a;

FIG. 6b is a schematic view of displaying the push information in the application classification folder corresponding to FIG. 6a;

FIG. 7b is a schematic view of displaying the push information in the application classification folder corresponding to FIG. 7a;

FIG. 8b is a schematic view of displaying the push information in the application classification folder corresponding to FIG. 8a;

FIG. 9b is a schematic view of displaying the push information in the application classification folder corresponding to FIG. 9a;

DETAILED DESCRIPTION

In order to make the technical solutions of the application be better understood by a person skilled in the art, the technical solutions of the embodiments of the application will be clearly and completely described in the following in conjunction with the drawings of the embodiments of the application. It is apparent that the described embodiments are only a part of the embodiments of the present application, and not all of them. All other embodiments obtained by a person of ordinary skill in the art based on the embodiments of the present application without paying creative work shall fall within the protection scope of the application.

The main idea of the embodiments of the present application is to determine an arrangement order of the push information in the application classification folder in the mobile terminal according to the weight of the application and the heat of the push information; determine the information push area in the application classification folder according to the triggering operation of the user; and display the push information in the information push area according to the determined arrangement order, thereby solving the problem of reducing the efficiency of the user to quickly locate the push information to be viewed in the plurality of push information in an information display manner of the prior art. Based on the above idea, the embodiments of the present application provide an information display method, an information display device, an information display apparatus, and a storage medium, wherein the information display method can be applied to a mobile terminal side and executed by the mobile terminal. A detailed description will be given below.

Figure 1:
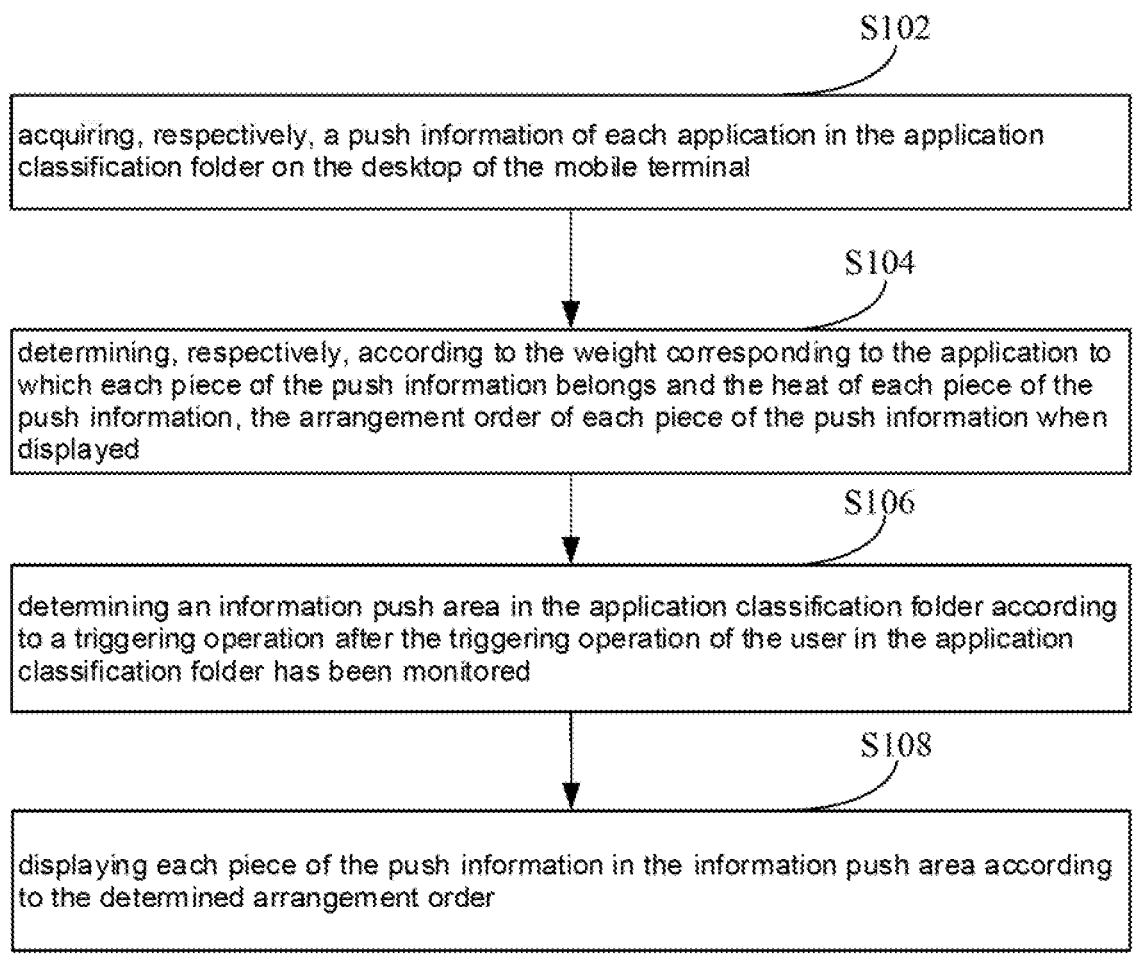
FIG. 1 is a schematic flowchart of an information display method provided by an embodiment of the present application.

FIG. 1 is a schematic flowchart of an information display method provided by an embodiment of the present application. As shown in FIG. 1, the method includes the following steps:

Step S102: acquiring, respectively, a push information of each application in the application classification folder on the desktop of the mobile terminal, wherein the application classification folder is used to store an icon corresponding to the application of the predetermined category in the mobile terminal.

In the embodiment, the mobile terminal has at least one application classification folder on the desktop, wherein the application classification folder may be created by a user, or may be automatically created by the mobile terminal, and each application classification folder is used to include an icon of the application of the same category. For example, the mobile terminal has QQ, WeChat, calculator, clock, Arena of Valor, TopBuzz, WeChat reading, Youku, NetEase Music, Jingdong, mobile Taobao and other applications on the desktop. By the mobile terminal according to the category of each application, the icons of QQ, WeChat are sorted into a social communication folder, the icons of the calculator and clock are sorted into a toolbox, the icon of the Arena of Valor is sorted into a game folder, and the icons of TopBuzz and WeChat reading are sorted into a news reading folder, the icons of Youku and NetEase Music are sorted into an audio and video play folder, and the icons of Jingdong and mobile Taobao are sorted into a shopping folder.

In this step, acquiring, respectively, multiple pieces of the push information of each application in the application classification folder on the desktop of the mobile terminal, for example, acquiring multiple pieces of the push information of the application in the above shopping folder, including Jingdong discount reminding information, Taobao offer reminder information or the like.

Step S104: determining, respectively, according to the weight corresponding to the application to which each piece of the push information belongs and the heat corresponding to, each piece of the push information, the arrangement order of each piece of the push information when displayed, wherein the weight corresponding to the application is respectively related to the usage information and the heat information corresponding to the application.

In the embodiment, after obtaining one or more pieces of the push information, the arrangement order of each piece of the push information when displayed can be determined according to the weight corresponding to the application to which each piece of the push information belongs and the heat of each piece of the push information. The arrangement order refers to the arrangement order from top to bottom when the push information is displayed.

Step S106: determining an information push area in the application classification folder according to a triggering operation after the triggering operation of the user in the application classification folder has been monitored.

Step S108: displaying each piece of the push information in the information push area according to the determined arrangement order.

The information display method in the embodiment of the present application includes: respectively acquiring the push information of each application in the application classification folder on the desktop of the mobile terminal; determining, respectively, according to the weight of the application to which each piece of the push information belongs and the heat of each piece of the push information, the arrangement order of each piece of the push information when displayed; determining an information push area in the application classification folder according to a triggering operation after the triggering operation of the user in the application classification folder has been monitored; and displaying each piece of the push information in the information push area according to the determined arrangement order. It is clear that, by means of the method in the embodiment of the present application, the information push area can be determined in the application classification folder to which the push information belongs according to the triggering operation of the user, and the push information of the application can be displayed in the information push area according to the weight of the application to which the push information belongs and the heat of the push information, thereby improving the efficiency of the user to quickly locate the push information to be viewed in multiple pieces of push information, facilitating the user to view the push information, thereby solving the problem of reducing the efficiency of the user to quickly locate the push information to be viewed in the plurality of push information in an information display manner of the prior art.

In the embodiment of the present application, after obtaining a piece of the push information of the application in the application classification folder, the push information may be displayed in a corresponding information push area, and the piece of information is displayed at the top of the information push area.

In the above step S102, the mobile terminal may obtain one or more pieces of the push information corresponding to the application in the application classification folder in multiple ways, for example, receiving push information of the application sent by the server, and then selecting, according to the application classification folder to which the application belongs, one or more pieces of the push information of the application in each application classification folder from the received push information; or, determining a content whose browsing frequency is higher than the predetermined frequency according to user's usage habit for the application in the application classification folder, sending information acquisition request to the server to request for an acquisition of the content whose browsing frequency is higher than the predetermined frequency, and using the obtained content whose browsing frequency is higher than the predetermined frequency as the push information of the application in the application classification folder.

In the above step S104, the weight of the application to which each piece of push information belongs may be obtained in the following ways:

(1a) determining a usage sub-weight of the application according to a frequency of utilization and an installation duration in the usage information of the application, and a predetermined usage sub-weight determination rule; and determining a heat sub-weight of the application according to a heat range in the heat information of the application, and a mapping relationship between the heat range and the heat sub-weight:

(1b) performing a weighted summation for the usage sub-weight and the heat sub-weight, respectively, to obtain the weight of the application.

In the action (1a), the mobile terminal can monitor the user operation, to obtain the usage information of the application. For example, the mobile terminal can record the installation time of the application when the user installs the application, thereby determining the installation duration of the application according to the installation time and the current time; and, the mobile terminal can monitor the time that the user starts the application each time, to obtain the usage of the application, for example, the installation duration of the application is 6 months, and the frequency of utilization is once every 1.5 days on average.

In the action (1a), the mobile terminal may send an application name or an application ID (identity) to the server; the server determines the heat information of the application based on the count of download of the application and the frequency of utilization of the application by a large number of users, and send the determined heat information to the mobile terminal. The heat information of the application includes the heat range, and the heat range can be represented in digital form. For example, the value range of the heat range is an integer from 1 to 5 in the closed interval. The larger the value, the more popular the application.

In the action (1a), the predetermined usage sub-weight determination rule may be a calculation formula of the usage sub-weight, and the frequency of utilization of the application and the installation duration of the application in the formula are variables. After the frequency of utilization and the installation duration of the application are brought into the formula, the usage sub-weight of the application can be calculated and obtained. The formula may further include a weight coefficient of the frequency of utilization of the application and a weight coefficient of the installation duration of the application. For example, the formula may be $S=a*a1+b*b1$, wherein, S is the usage sub-weight of the application, a is the frequency of utilization of the application, a1 is the weight coefficient of the frequency of utilization of the application, b is the installation duration of the application, and b1 is the weight coefficient of the installation duration of the application. In the embodiment of the present application, the specific form of calculation formula of the usage sub-weight is not limited, and other formulas that are used to calculate the usage sub-weight of the application according to the frequency of utilization of the application and the installation duration of the application may be used as the calculation formula of the usage sub-weight.

In the action (1a), the mapping relationship between the heat range and the heat sub-weight can reflect the heat sub-weights corresponding to different heat ranges. For example, if the heat range of the application is level 1, the heat sub-weight of the application is 0.5, and if the heat range of the application is level 2, the heat sub-weight of the application is 2. Of course, in other embodiments, the heat sub-weight of the application can also be calculated according to the calculation formula of the heat sub-weight. For example, the calculation formula of the heat sub-weight is $D=c*c1$, wherein D is the heat sub-weight, c is the heat range, and c1 is the calculation coefficient of the heat range.

After the usage sub-weight and the heat sub-weight are determined by the action (1a), the usage sub-weight and the heat sub-weight can be respectively weighted and summed by the action (1b), to obtain the weight of the application. For example, the weight coefficient of the usage sub-weight is m, the weight coefficient of the heat sub-weight is n, the usage sub-weight and the heat sub-weight are respectively multiplied by the respective weight coefficients and then summed, to obtain the weight of the application.

In the embodiment, by the above actions (1a) and (1b), it is possible to comprehensively and accurately determine the weight of the application to which the push information belongs from the frequency of utilization of the application, the installation duration and the heat range of the application so as to provide an accurate basis for the ranking of the subsequent push information.

In the embodiments, in order to facilitate the quick determination of the weight of the application to which the push information belongs, the mobile terminal may, for each application in the application classification folder, determine the weight of each application and store it in a memory according to the way of the above action (1a) and the action (1b) before performing step S102: and then in step S104, the weight of the application to which the push information belongs is, directly found out from the memory.

In the above step S104, the mobile terminal further determines the heat of each piece of the push information. For example, when the server sends the push information, it also sends the heat of the push information. The heat of the push information may be represented in a digital form, the higher the number, the higher the heat of the push information. For example, the heat of a certain push information is 5, which is one of the most popular intonation at present. For the push information of news type, the server can determine the heat of the push information of news type according to the content of the push information of news type. For the push information of the weather application and the chat application, the server can set corresponding default heat thereof. When receiving the push information, the mobile terminal also receives the heat of the push information, thereby determining, the heat of each piece of the push information.

In the above step S104, the mobile terminal determines, according to the weight of the application to which each piece of push information belongs and the heat of each piece of the push information, the arrangement order of each piece of the push information when displayed, which may be a display index corresponding to each piece of push information can be respectively determined according to the weight of the application to which each piece of the push information belongs and the heat of each piece of push information; and the arrangement order of each piece of the push information when displayed according to the display index of each, piece of the push information. Wherein the display index of the push information is positively correlated with the weight of the application to which the push information belongs, and is positively correlated with the heat of the push information.

Specifically, a calculation formula of the display index is set in the embodiments. In the formula, the display index of the push information is positively correlated with the weight of the application to which the push information belongs, and is positively correlated with the heat of the push information, for example, the display index T is equal to the sum of the weight Q of the application to which the push information belongs and the heat R of the push information. Therefore, the higher the weight of the application to which the push information belongs, the higher the display index the higher the heat corresponding to the push information, the higher the display index. In the embodiments, the high to low order of the display index of each piece of push information is the top to bottom arrangement order of each piece of push information when displayed.

For example, if the display index of a piece of push information of WeChat is 10, and the display index of a piece of push information of QQ is 7, the piece of push information of WeChat is displayed above the piece of push information of QQ in the process of displaying each piece of the push information.

In the embodiment, according to the weight corresponding to the application and the heat corresponding to the push information, the arrangement order of each piece of the push information is determined when each piece of push information is displayed, which can ensure that hot and important push information can be displayed at the top, and unimportant and unpopular push information can be displayed at the bottom, so as to make it easy for the user, when reading, to quickly locate the required push information according to the usual top-to-bottom reading habits and improve the user's reading experience.

In a specific embodiment, if the mobile terminal acquires multiple pieces of the same push information, the mobile terminal selects, according to the frequency of utilization of the application to which each of the same push information belongs, the push information with highest frequency of utilization of the application in the multiple pieces of the same push information, and determines the display index of the selected push information, so that when a repeated push information is obtained, the push information with the highest frequency of utilization of the application is displayed, to conform to the user's usage habit for application, and improve the user's usage experience for application.

In the above step S106, after the triggering operation of the user in the application classification folder has been monitored, determining the information push area in the application classification folder according to the triggering operation, specifically includes:

(2a) when the triggering operation is a sliding operation, correspondingly moving in the application classification folder all the display elements in the application classification folder according to a direction of the sliding operation; and generating in the application classification folder a blank area corresponding to the application classification folder in a direction opposite to the direction of the sliding operation, and a blank area being used as the push information area; or, (2b) when the triggering operation is a click operation, popping up in the application classification folder an information push interface corresponding to the application classification folder according to the click operation and a blank area in the information push interface being used as the information push area.

In the mode (2a), if the user performs a sliding operation in the application classification folder, for example, sliding in a first direction, all the display elements corresponding to the application classification folder are moved in the first direction in the application classification folder. Thereby, a blank area is generated in a direction opposite to the first direction in the application classification folder. The blank area refers to an area where no display elements exist, and the blank area is used as the information push area. In a specific implementation, when the direction of the sliding operation is downward, a blank area is generated in the application classification folder in a manner of pull-down floating screen.

In the embodiment of the present invention, the above display element may be an icon, a floating window or a control plug-in or the like.

Figure 2A:
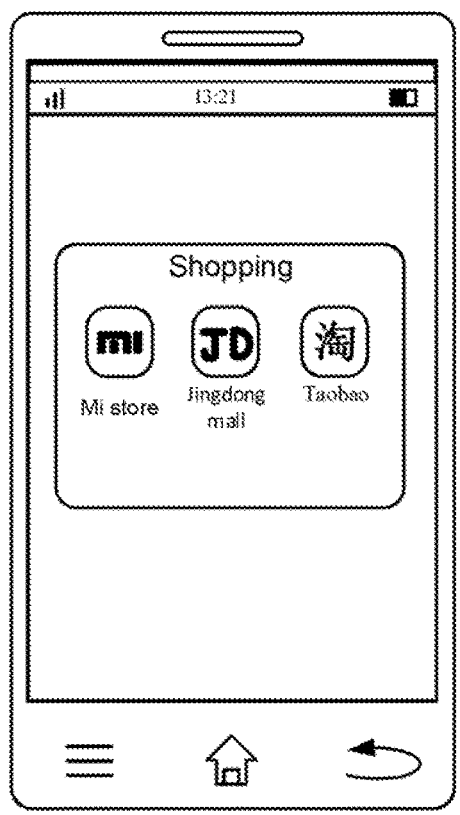
FIG. 2a is a schematic view of an application classification folder provided by an embodiment of the present application.
Figure 2B:
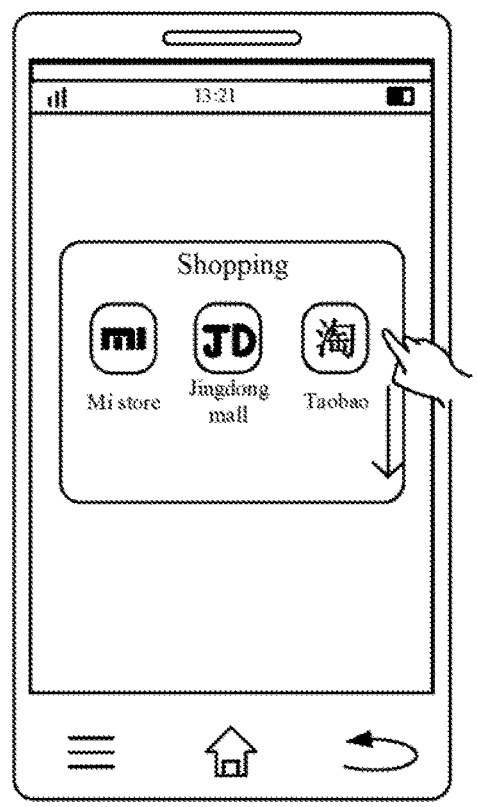
Figure 2C:
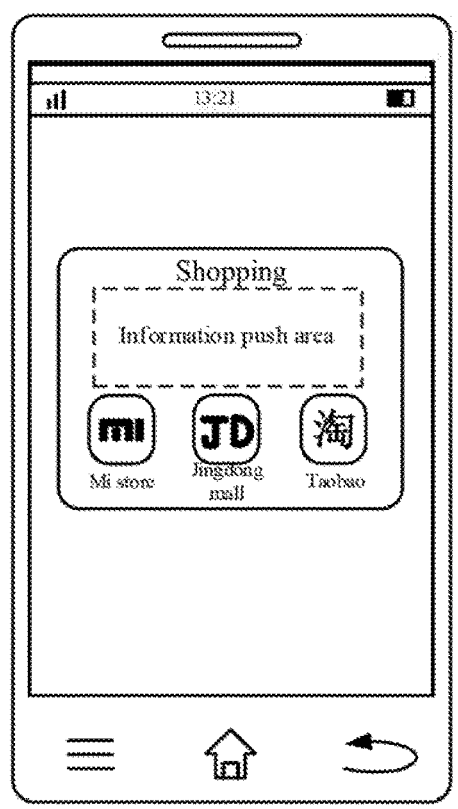
FIG. 2c is a schema view of determining information push, area corresponding to FIG. 2b.

FIG. 2a is a schematic view of an application classification folder provided by an embodiment of the present application, FIG. 2b is a schematic view of sliding operation of a user corresponding to FIG. 2a, and FIG. 2c is a schematic view of determining information push area corresponding to FIG. 2b. As shown in FIG. 2b and FIG. 2c, when the user performs a downward sliding operation in the application classification folder, all the corresponding display elements in the application classification folders are moved downward, to form an effect of pull-down floating screen; a blank area is generated above the application classification folder, and the blank area is used as an information push area.

Figure 2D:
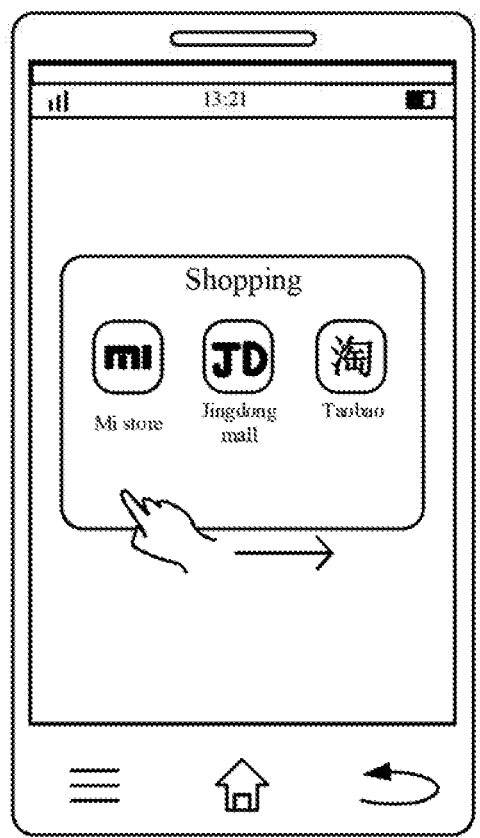
Figure 2E:
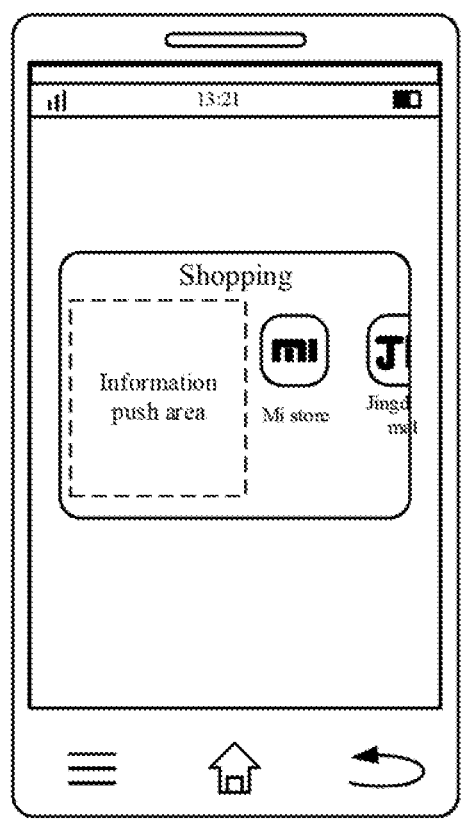
FIG. 2e is a schematic view of determining information push area corresponding to FIG. 2d.

FIG. 2d is another schematic view of sliding operation of a user corresponding to FIG. 2a, and FIG. 2e is schematic view of determining information push area corresponding to FIG. 2d. As shown in FIG. 2d and FIG. 2e, when the user performs a sliding operation toward right in the application classification folder, all the corresponding display elements in the application classification folder are moved toward right; a blank area is generated at the left side of the application classification folder, and the blank area is used as an information push area.

In the mode (2b), when the user performs a click operation in the application classification folder, the information push interface is popped up in the application classification folder according to the click operation. The blank area where no elements are displayed in the information push interface, is the information push area. Wherein, the click operation can be a double-click operation or a single-click operation.

Figure 3A:
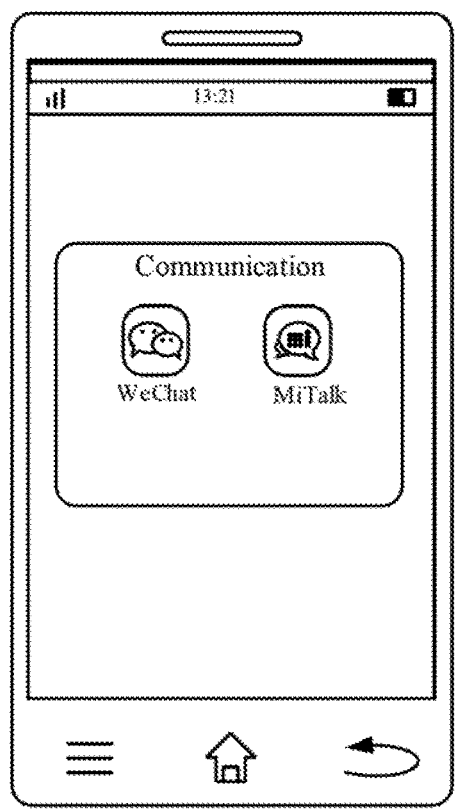
FIG. 3a is another schematic view of an application classification folder provided by an embodiment of the present application.
Figure 3B:
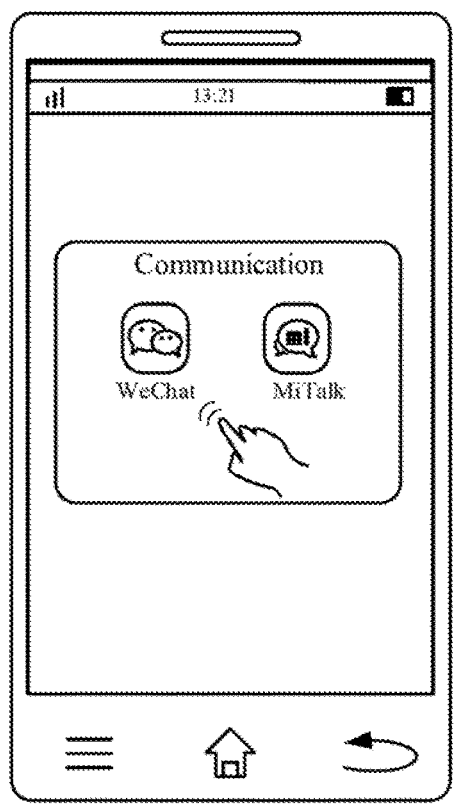
Figure 3C:
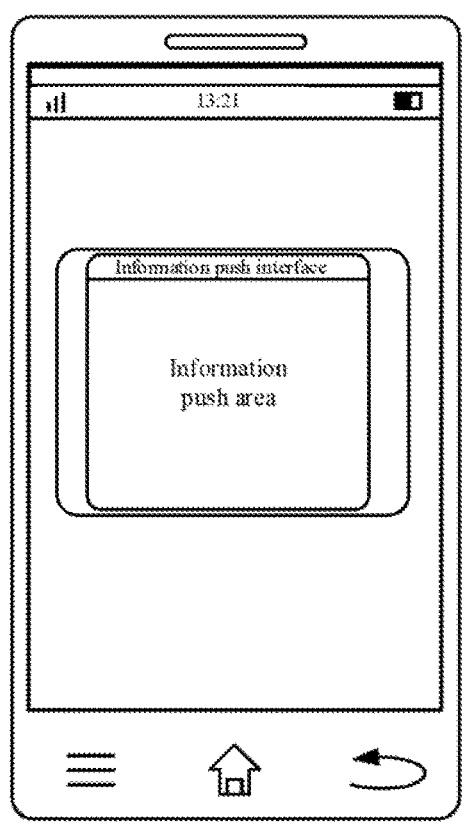
FIG. 3c is a schematic view of determining information push area corresponding to FIG. 3b.

FIG. 3a is another schematic view of an application classification folder provided by an embodiment of the present application, FIG. 3b is a schematic view of click operation of a user corresponding to FIG. 3a, and FIG. 3c is a schema view of determining information push area corresponding to FIG. 3b. As shown in FIG. 3b and FIG. 3c, when the application classification folder has the push information, the user performs a double-click operation in the application classification folder, then the information push interface is popped up in the application classification folder, and the blank area in the interface is the information push area.

In the embodiment a plurality of triggering operations for viewing the push information are set, and the information push area is determined according to each kind of triggering operation, so that the user can flexibly determine the information push area according to personal habits, thereby improving the user's terminal usage experience.

In the embodiment, after the information push area is determined by the above mode (2a), the information push area can be set to maintain for a predetermined period of time, for example, the information push area maintains for 10 seconds or 15 seconds, thereby facilitating the user to read the push information displayed in the information push area. The icon in the application classification folder can be restored to the original position; or when the user performs a sliding operation in a direction opposite to the direction of the sliding operation of determining the information push area, the icon in the application classification folder is restored to the original position, and the information push area is closed, thus the information push area is controlled to be displayed or disappeared according to the user's operation; or when the user performs a next single-click or double-click operation, the information push area is closed, and the icon in the application classification folder is restored to the original position, thereby facilitating the user to read the contents displayed in the information push area.

In order to facilitate the user to know that the application has the push information, in the embodiment, the mobile terminal, after acquiring one or more pieces of the push information of the application in the application classification folder, further displays a prompt information of each piece of the push information, such that the user performs the above triggering operation of viewing the push information in the application classification folder.

Figure 4A:
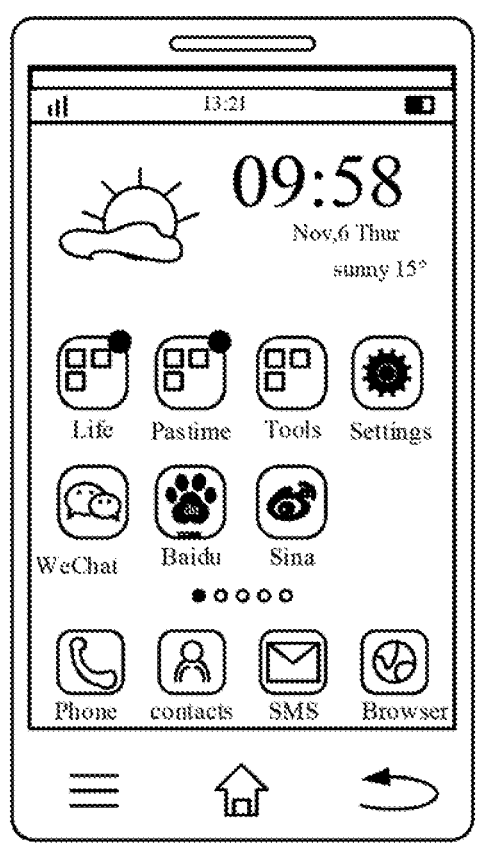
FIG. 4a is a schematic view of displaying prompt information provided by an embodiment of the present application.
Figure 4B:
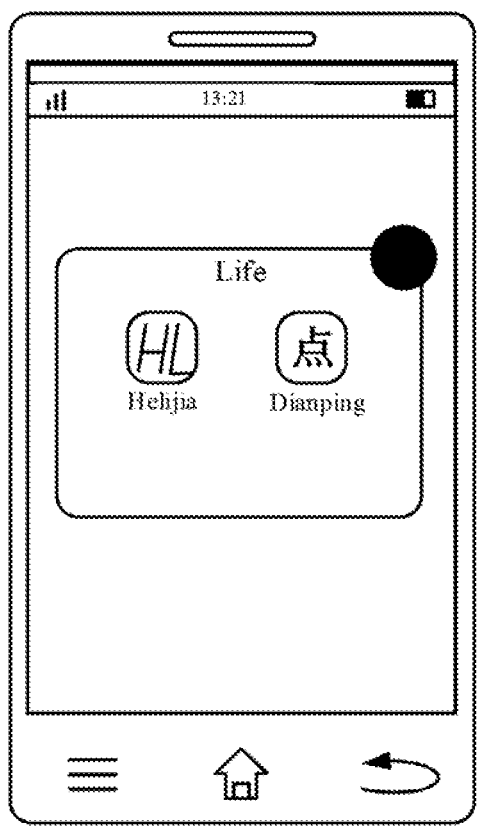
FIG. 4b is another schematic view of displaying prompt information provided by an embodiment of the present application.

FIG. 4a is a schematic view of displaying prompt information according to an embodiment of the present application. As shown in FIG. 4a, a dot is displayed at each application classification folder on the desktop of the mobile terminal to prompt the user that the application classification folder has push information. FIG. 4b is another schematic view of displaying prompt information according to an embodiment of the present application. As shown in FIG. 4b, a dot is displayed in each application classification folder of the mobile terminal to prompt the user that the application classification folder has push information. In another embodiment, a prompt identifier, such as a dot, may be displayed on the icon of the application with the push information, to display specific push information of a certain application.

By displaying the prompt information corresponding to the push information, the user can know that there is viewable push information, thereby facilitating the user to view the push information.

Figure 5:
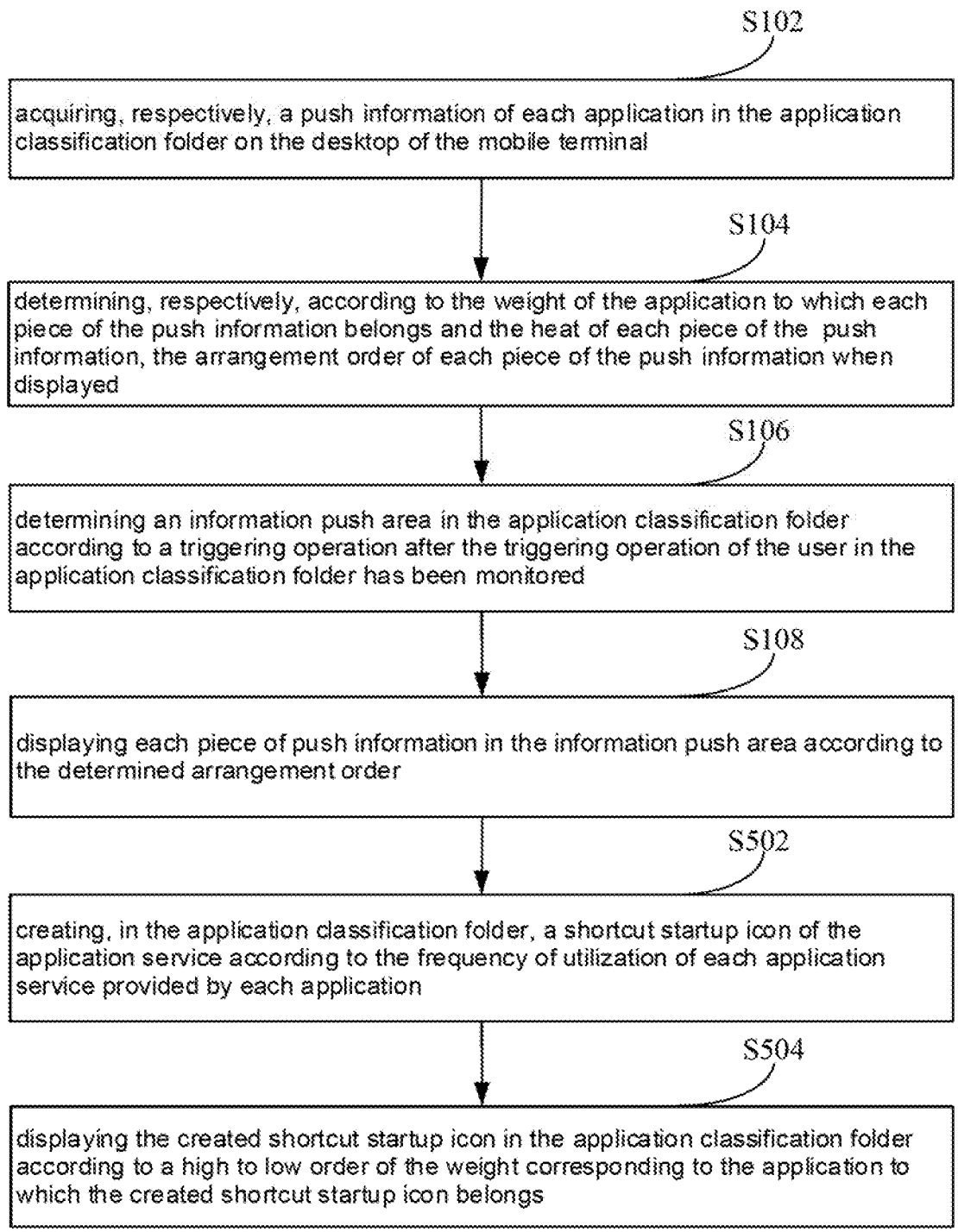
FIG. 5 is another schematic flowchart of an information display method provided by an embodiment of the present application.

In the embodiments, considering that the frequency of utilization of the application service provided by some applications is high, for example, the frequency of utilization of the "Scan" of WeChat is high, and in order to facilitate the user to use, the application service, FIG. 5 is another schematic flowchart of an information display method provided by an embodiment of the present application. As shown in FIG. 5, the method, after step S108, further includes the following steps:

Step S502: creating, in the application classification folder, a shortcut startup icon of the application service according to frequency of utilization of each application service provided by each application;

Step S504: displaying the created shortcut startup icon in the application classification folder according to a high to low order of the weight corresponding to the application to which the created shortcut startup icon belongs.

Specifically, the mobile terminal determines, in the application classification folder, frequency of utilization corresponding to each application service provided by each application, and creates a shortcut startup icon for the application service whose frequency of utilization is higher than the set frequency. The mobile terminal may display the created shortcut startup icon from left to right at the bottom of the application classification folder according to the high to low order of the weight corresponding to the application to which the created shortcut startup icon belongs.

For example, there are an Alipay application and a WeChat application in the application classification folder. The mobile terminal detects that the frequency of utilization of "Scan" in the Alipay application is higher than the set frequency, so the mobile terminal creates a shortcut startup icon for "Scan" function in the Alipay application. The mobile terminal detects that the frequency of utilization of "Scan" in the WeChat application is higher than the set frequency, so the mobile terminal creates a shortcut startup icon for "Scan" function in the WeChat application. Since the weight of WeChat application is higher than the weight of the Alipay application, the mobile terminal sequentially displays the shortcut startup icon of "Scan" in the WeChat application and the shortcut startup icon of "Scan" in the Alipay application from left to right at the bottom of the application classification folder.

In the embodiment, according to frequency of utilization of the application service, a shortcut startup icon of the application service is created, and displayed in the application classification folder, which can facilitate the user to use the commonly used application service and improve user's usage experience of the application.

Figure 6A:
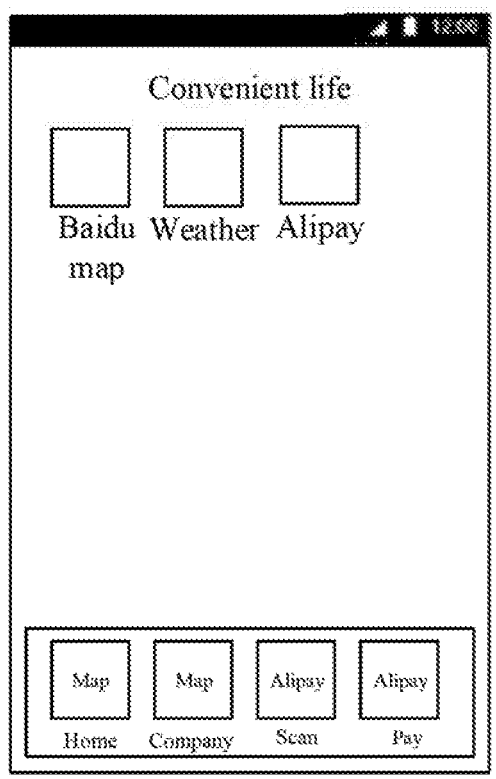
FIG. 6a is a schematic view of displaying a shortcut ta up icon of an application service in an application classification folder.

FIG. 6a is a schematic view of displaying a shortcut startup icon of an application service in an application classification folder. As shown in FIG. 6a, the application classification folder includes three applications of Baidu map, weather, and Alipay. In the Baidu map, the frequency of the usage of the home route navigation by the user is higher than the set frequency, so a shortcut startup icon is created for the home route. Similarly, a shortcut startup icon is created for the company route. In Alipay, the frequency of the usage of "Scan" and "Pay" by the user is higher than the set frequency, so a shortcut startup icon is created for "Scan" and "Pay". Since the weight of Baidu map application is higher than the weight of Alipay application, a shortcut startup icon corresponding to Baidu map and a shortcut startup icon corresponding to Alipay are sequentially displayed from left to right at the bottom of the classification folder.

Figure 6B:
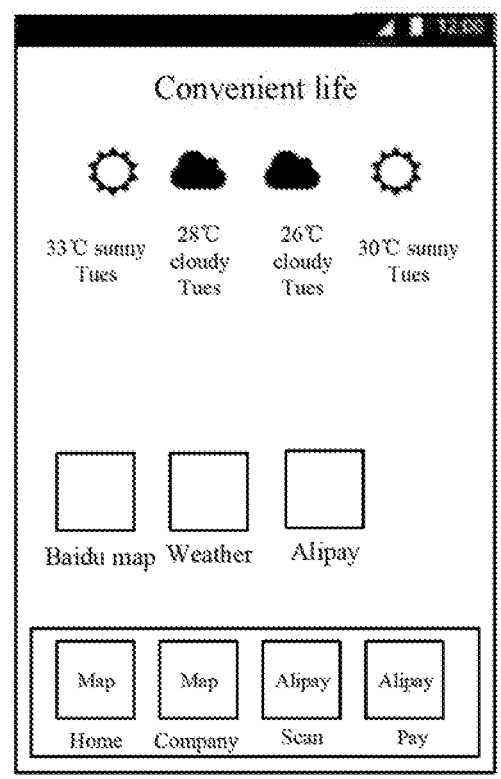

FIG. 6b is a schematic view of displaying the push information in the application classification folder corresponding to FIG. 6a The mobile terminal, after receiving the push information of the weather application, monitors that the user performs a pull-down hovering operation in the application classification folder, then the icon in the application classification folder is moved downward, and a blank, area is generated at the top of the application classification folder, to display the push information of the weather application, that is, recent four days weather conditions.

Figure 7A:
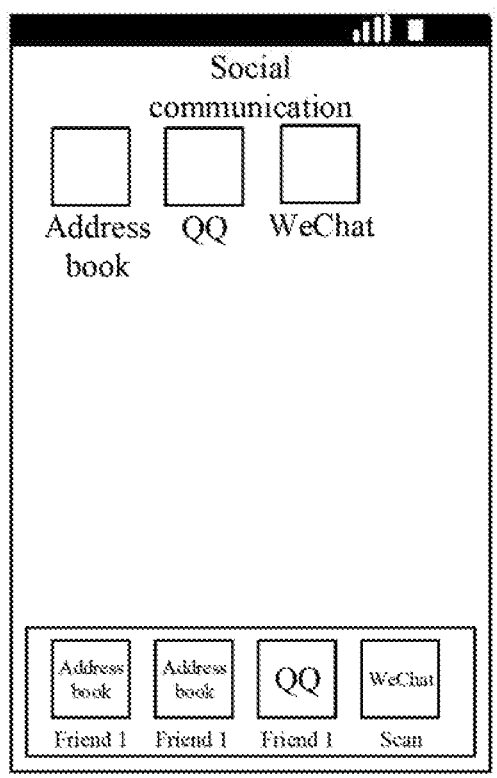
FIG. 7a is a schematic view of displaying a shortcut startup icon of an application service in an application classification folder.

FIG. 7a is a schematic view of displaying a shortcut startup icon of an application service in an application classification folder. As shown in FIG. 7a, the application classification folder includes three applications of address book, QQ, and WeChat. Since the contact frequency of the user with a Friend 1 and a Friend 2 in the address book is higher than the set frequency, the contact frequency of the user with a good Friend 1 in QQ is higher than the set frequency, the frequency of the user using "Scan" in WeChat is higher than the set frequency, the weight of the address book is higher than the weight of QQ, and the weight of QQ is higher than the weight of WeChat, the created shortcut start icons for Friend 1, Friend 2, good Friend 1 and "Scan" in WeChat is sequentially displayed from left to right at the bottom of the application classification folder.

Figure 7B:
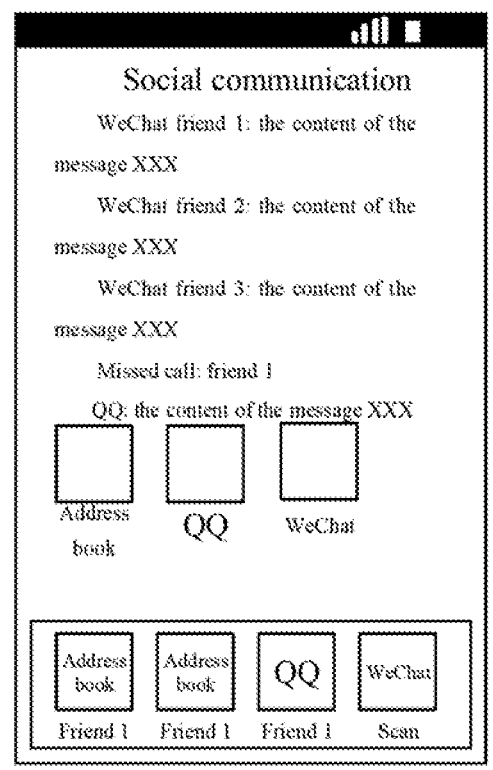

FIG. 7b is a schematic view of displaying the push information in the application classification folder corresponding to FIG. 7a. The mobile terminal, after receiving the push information of the application in the application classification folder, monitors that the user performs a pull-down hovering operation in the application classification folder, the icons of each application are moved downwards and are in a pull-down hovering state. The push information of WeChat the push information of the address book, and the push information of QQ can be displayed at the top of the application classification folder. Since a display index of recommendation information of WeChat is larger than a display index of recommendation information of the address book, a display index of recommendation information of the address book is larger than a display index of recommendation information of QQ, the push information of WeChat, the address book and QQ are displayed in the order from top to bottom.

Figure 8A:
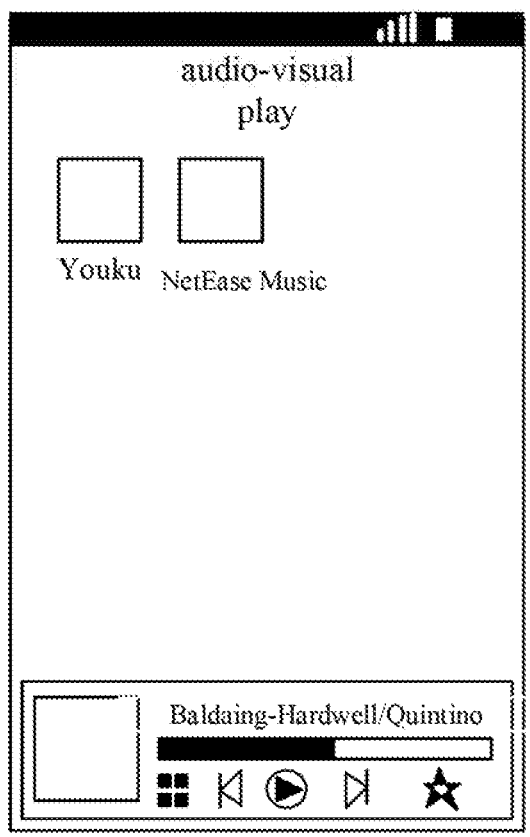
FIG. 8a is a schematic view of displaying a shortcut startup icon of an application service in an application classification folder.

FIG. 8a is a schematic view of displaying a shortcut startup icon of an application service in an application classification folder. As shown in FIG. 8a, the application classification folder includes two applications of Youku and NetEase Music. The mobile terminal detects that the frequency of the user watching video by Youku and the frequency of the user listening to music by NetEase Music are both greater than the set frequency, thus a shortcut startup icon is created for the listening music function of Youku and NetEase Music, respectively. The shortcut startup icon is a widget form, however, due to the weight of NetEase Music is higher than the weight of Youku, and only one widget can be displayed in the application classification folder, so the widget of NetEase Music is displayed at the bottom of the application classification folder by the mobile terminal.

Figure 8B:
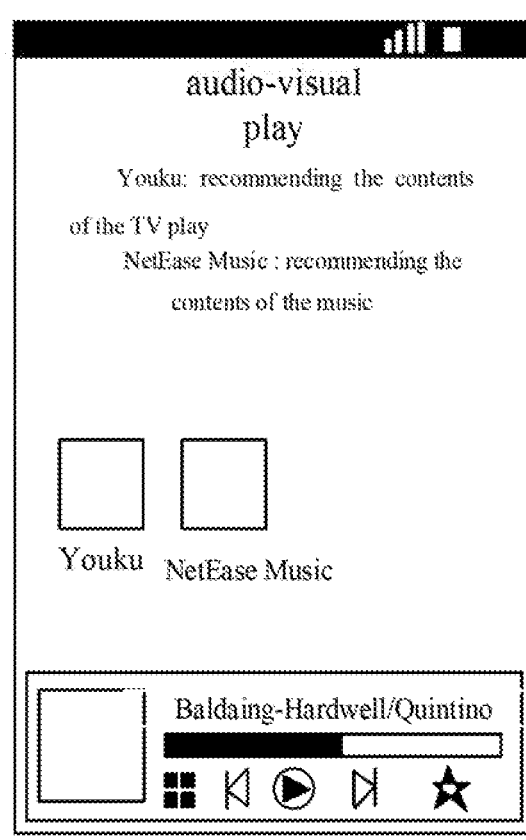

FIG. 8b is a schematic view of displaying the push information in the application classification folder corresponding to FIG. 8a. The mobile terminal, after receiving the recommendation information of NetEase Music and Youku, detects that the user performs a pull-down hovering operation in the application classification folder, then the icons of each application are moved downwards and are in a pull-down hovering state. Since a display index of recommendation information of Youku is larger than a display index of recommendation information of NetEase Music, the recommendation information of Youku and NetEase Music is sequentially arranged from top to bottom at the upper blank area of the application classification folder.

Figure 9A:
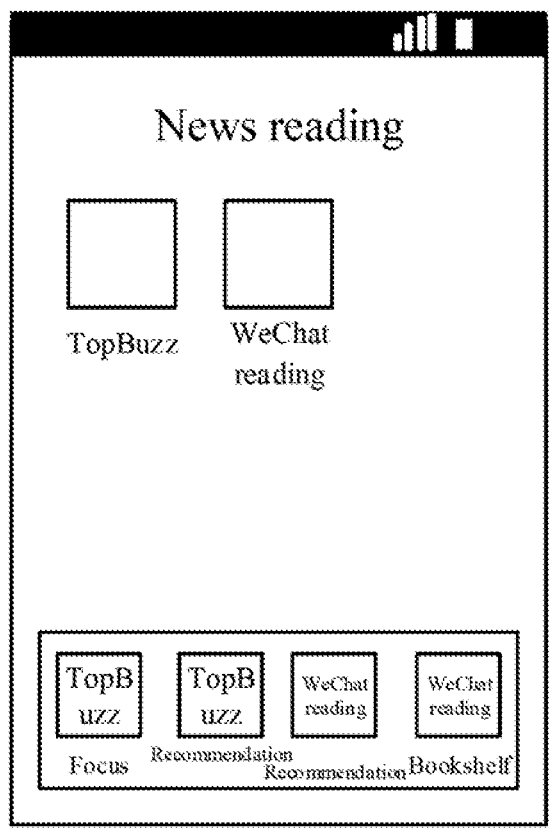
FIG. 9a is a schematic view of displaying a shortcut startup icon of an application service in an application classification folder.

FIG. 9a is a schematic view of displaying a shortcut startup icon of an application service in an application classification folder. As shown in FIG. 9a, the application classification folder includes TopBuzz and WeChat reading. According to the above similar reasons, shortcut startup icons are created for focus news and recommended news in TopBuzz by the mobile terminal, shortcut startup icons are created for recommended readings and bookshelves in WeChat reading, and shortcut startup icons for TopBuzz and shortcut startup icons for WeChat reading are, sequentially displayed from left to right at the bottom of the application classification folder according to the fact that the weight of TopBuzz is larger than the weight of WeChat reading.

Figure 9B:
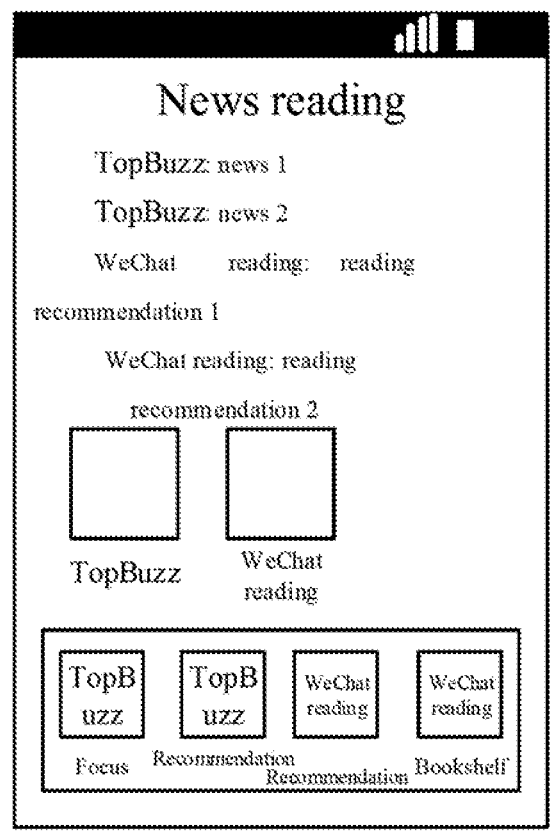

FIG. 9b is a schematic view of displaying the push information in the application classification folder corresponding to FIG. 9a. The mobile terminal, after acquiring the recommendation information of TopBuzz and WeChat reading, detects that the user performs a pull-down hovering operation in the application classification folder, the icons of each application are moved downwards and are in a pull-down hovering state. Since a display index of recommendation information of TopBuzz is larger than a display index of recommendation information of WeChat reading, the recommendation information of TopBuzz and WeChat reading is sequentially arranged from top to bottom at the upper blank area of the application classification folder.

Figure 10:
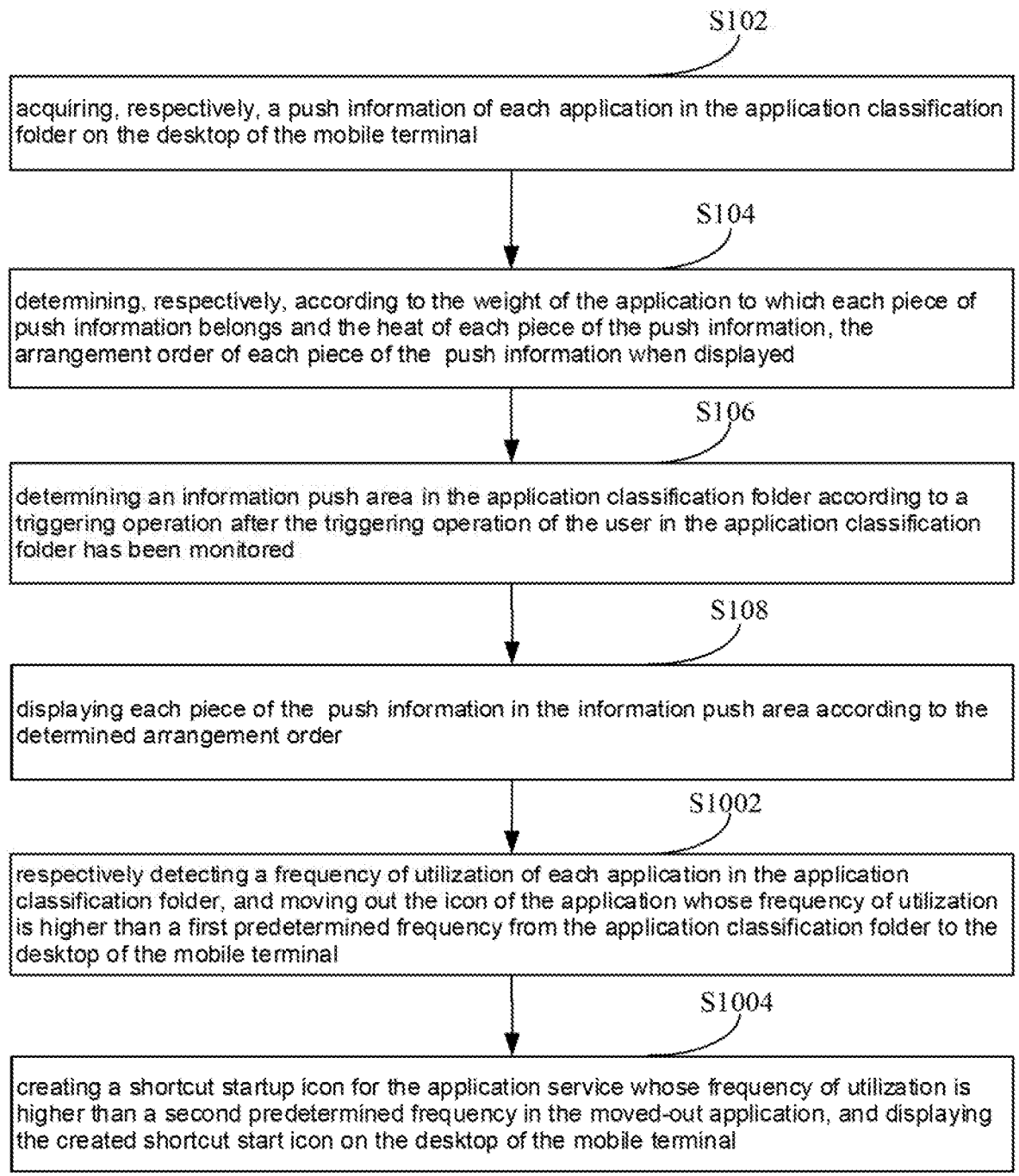
FIG. 10 is still another schematic flowchart of an information display method provided by an embodiment of the present application.

In the embodiment of the present application, in consideration of some applications with a high frequency of utilization, it is disadvantageous for the user to quickly use the applications when the icons of the applications are located in the application classification folder. FIG. 10 is still another schematic flowchart of an information display method provided by an embodiment of the present application, as shown in FIG. 10, after step S108, the method further includes the following steps:

Step S1002: respectively detecting the frequency of utilization of each application in the application classification folder, and moving out the icon of the application whose frequency of utilization is higher, than a first predetermined frequency from the application classification folder to the desktop of the mobile terminal;

Step S1004: creating the shortcut startup icon for the application service whose frequency of utilization is higher than a second predetermined frequency in the moved-out application, and displaying the created shortcut start icon on the desktop of the mobile terminal.

For example, respectively detecting the frequency of utilization of each application in the application classification folder, moving out the icon of the fitness application from the application classification folder to the desktop of the mobile terminal when it is determined that the frequency of utilization of the fitness application is higher than the first predetermined frequency; and for the fitness application, when it is detected that the frequency of utilization of one of the training courses is higher than the second predetermined frequency, creating a shortcut startup icon for the training course and displaying the created shortcut startup icon on the desktop of the mobile terminal.

In the embodiments, by moving the icon of the application with a higher frequency of utilization to the desktop of the mobile terminal and creating a shortcut startup icon for the application service with a higher frequency of utilization, the user can conveniently use the frequently used application to improve the users terminal usage experience.

Figure 11:
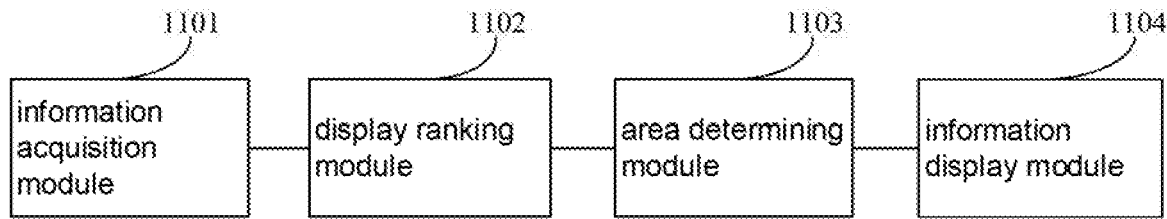
FIG. 11 is a schematic view of a composition of an information display device provided by an embodiment of the present application.

Corresponding to the information display method in the foregoing embodiment, the embodiment of the present application further provides an information display device, which is applied to a mobile terminal FIG. 11 is a schematic view of a composition of an information display device provided by an embodiment of the present application. As shown in FIG. 11, the device includes:

an information acquisition module 1101, configured to acquire, respectively, a push information of each application in an application classification folder on a desktop of the mobile terminal, wherein the application classification folder used to store an icon corresponding to the application of a predetermined category in the mobile terminal;

a display ranking module 1102, configured to determine, respectively, according to the weight corresponding to the application to which each piece of the push information belongs and the heat corresponding to each piece of the push information, the arrangement order of each piece of the push information when displayed, wherein the weight corresponding to the application is respectively related to the usage information and the heat information corresponding to the application;

an area determining module 1103, configured to determine, after the triggering operation of the user in the application classification folder has been monitored, the information push area in the application classification folder according to the triggering operation; and an information display module 1104, configured to display each piece of the push information in the information push area according to the determined arrangement order.

Optionally, the device further includes:

a first weight determining module, configured to determine the usage sub-weight of the application according to the frequency of utilization and the installation duration in the usage information of the application, and a predetermined usage sub-weight determination rule; and determine the heat sub-weight of the application according to the heat range in the heat information of the application and the mapping relationship between the heat range and the heat sub-weight; and a second weight determining module, configured to perform a weighted summation for the usage sub-weight and the heat sub-weight, respectively, to obtain the weight of the application.

Optionally, the display ranking module 1102 is specifically configured to:

determine, respectively, a display index of each piece of the push information according to the weight corresponding to the application to which each piece of the push information belongs and the heat of each piece of the push information;

determine the arrangement order of each piece of the push information when displayed according to the display index of each piece of the push information;

wherein the display index is positively correlated with the weight corresponding to the application to which the push information belongs, and is positively correlated with the heat corresponding to the push information.

Optionally, the area determining module 1103 is specifically configured to:

when the triggering operation is a sliding operation, correspondingly moving in the application classification folder all the display elements according to the direction of the sliding operation; and generating in the application classification folder a blank area corresponding to the application classification folder in the direction opposite to the direction of the sliding operation, and the blank area being used as the push information area;

or, when the triggering operation is a click operation, popping up in the application classification folder the information push interface corresponding to the application classification folder according to the click operation, and the blank area in the information push interface being used as the information push area.

Optionally, the device further includes:

a prompting module, configured to display, after acquiring one or more pieces of the push information corresponding to the application in the application classification folder, the prompt information corresponding to each piece of the push information, such that the user performs the above triggering operation in the application classification folder.

Figure 12:
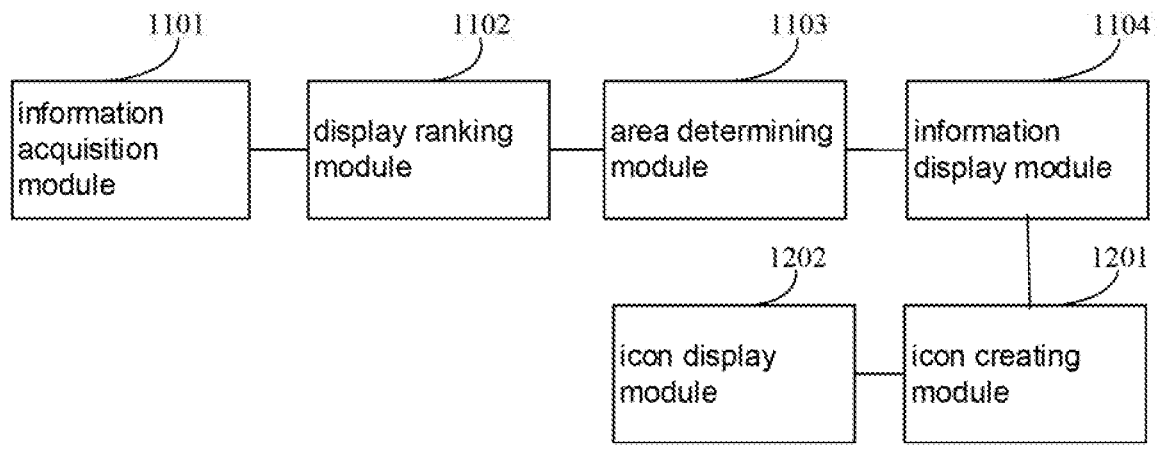
FIG. 12 is a schematic view of another composition of an information display device provided by an embodiment of the present application.

FIG. 12 is a schematic view of another composition of an information display device provided by an embodiment of the present application. As shown in FIG. 12, optionally, the device further includes:

an icon creating module 1201, configured to create, in the application classification folder, a shortcut startup icon of the application service according to the frequency of utilization corresponding to each application service provided by each application, and an icon display module 1202, configured to display the created shortcut startup icon in the application classification folder according to a high to low order of the weight corresponding to the application to which the created shortcut startup icon belongs.

Figure 13:
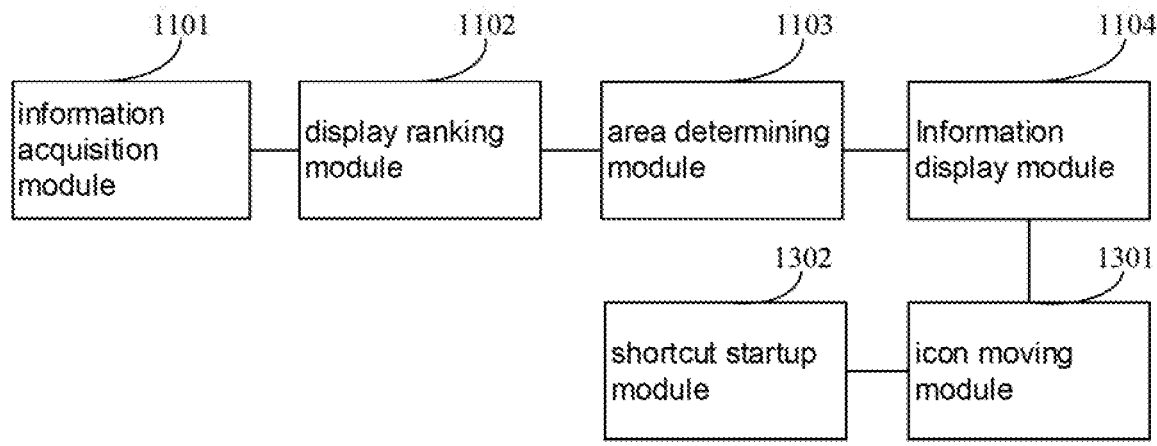
FIG. 13 is a schematic view of still another composition of an information display device provided by an embodiment of the present application.

FIG. 13 is a schematic view of still another composition of an information display device provided by an embodiment of the present application. As shown in FIG. 13, the device further includes:

an icon moving module 1301, configured to respectively detect the frequency of utilization of each application in the application classification folder, and move out the icon of the application whose frequency of utilization is higher than a first predetermined frequency from the application classification folder to the desktop of the mobile terminal; and a shortcut startup module 1302, configured to create the shortcut startup icon for the application service whose frequency of utilization is higher than a second predetermined frequency in the move-out application, and display the created shortcut startup icon on the desktop of the mobile terminal.

It can be seen that, by the device in the embodiment of the present application, the information push area can be determined in the application classification folder to which the push information belongs according to the triggering operation of the user, and the push information of the application can be displayed in the information push area according to the weight of the application to which the push information belongs and the heat of the push information, thereby improving the efficiency of the user to quickly locate the push information to be viewed in multiple pieces of push information, facilitating the user to view the push information, thereby solving the problem of reducing the efficiency of the user to quickly locate the push information to be, viewed in the plurality of push information in an information display manner of the prior art.

The information display device provided by the embodiment of the present application can also perform the method performed by the information display device in FIG. 1 to FIG. 10, and implement the functions of the information display device in the embodiments shown in FIG. 1 to FIG. 10, which will not be described herein again.

Figure 14:
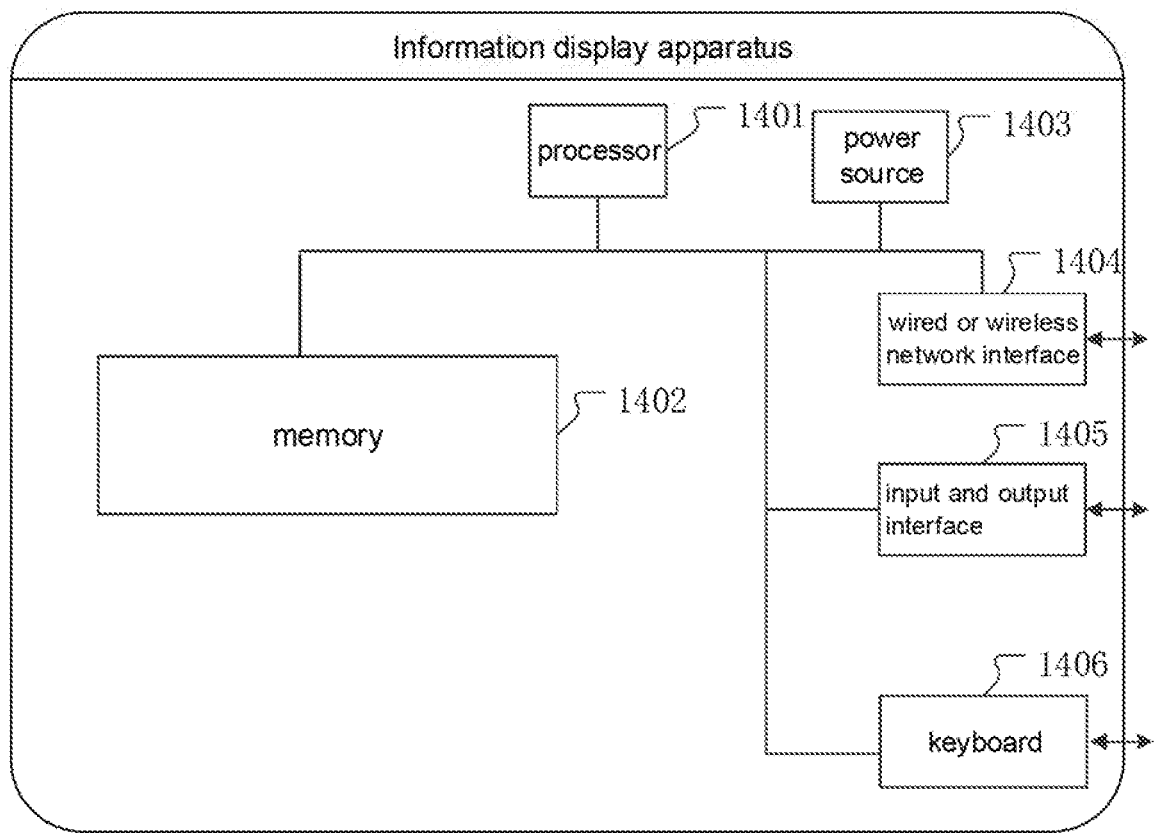
FIG. 14 is a schematic structural view of an information display apparatus provided by an embodiment of the present application.

Further, the embodiment of the present application further provides an information display apparatus, which may be a mobile terminal. FIG. 14 is a schematic structural view of an information display apparatus provided by an embodiment of the present application. As shown in FIG. 14, a relatively large difference may be generated owing to different configuration or performance of the information display apparatus, and the information display apparatus may include one or more processors 1401 and memory 1402, wherein one or more storage applications or data may be stored in memory 1402. The memory 1402 can be temporary storage or permanent storage. The applications stored in the memory 1402 may include one or more modules (not shown), each of which may include a series of computer executable instructions in the information display apparatus. Still further, the processor 1401 can be configured to communicate with the memory 1402 to execute a series of computer executable instructions in the memory 1402 on the information display apparatus. The information display apparatus may further include one or more power sources 1403, one or more wired or wireless network interfaces 1404, one or more input and output interfaces 1405, one or more keyboards 1406, and the like.

In a specific embodiment, an information display apparatus includes a memory, and one or more programs, wherein one or more programs are stored in the memory, and one or more programs can include one or more modules; each module can include a series of computer executable instructions in the information display apparatus, which implement, when executed by one or more processors, the following steps of:

acquiring, respectively, push information of each application in the application classification folder on the desktop of the mobile terminal, wherein the application classification folder is used to store an icon corresponding to the application of the predetermined category in the mobile terminal;

determining, respectively according to the weight corresponding to the application to which each piece of push information belongs and the heat corresponding to each, piece of push information, the arrangement order of each piece of push information when displayed, wherein the weight corresponding to the application is respectively related to the usage information and the heat information corresponding to the application;

determining an information push area in the application classification folder according to a triggering operation after the triggering operation of the user in the application classification folder has been monitored;

displaying each piece of push information in the information push area according to the determined arrangement order.

Optionally, the computer executable instructions when executed, further implement the steps of:

determining the usage sub-weight of the application according to the frequency of utilization and the installation duration in the usage information of the application and a predetermined usage sub-weight determination rule; and determining the heat sub-weight of the application according to the heat range in the heat information of the application and the mapping relationship between the heat range and the heat sub-weight;

performing a weighted summation for the usage sub-weight and the heat sub-weight, respectively, to obtain the weight of the application.

Optionally, in the process of executing the computer executable instructions, determining, according to the weight of the application to which each piece of push information belongs and the heat corresponding to each piece of push information, the arrangement order of each piece of push information when displayed, includes:

respectively determining a display index of each piece of push information according to the weight corresponding to the application to which each piece of the push information belongs and the heat of each piece of push information;

determining the arrangement order of each piece of the push information when displayed according to the display index of each piece of push information;

wherein the display index is positively correlated with the weight of the application to which the push information belongs, and is positively correlated with the heat of the push information.

Optionally, in the process of executing the computer executable instructions, determining an information push area in the application classification folder according to a triggering operation, includes:

when the triggering operation is a sliding operation, correspondingly moving in the application classification folder all the display elements according to the direction of the sliding operation; and generating in the application classification folder a blank area corresponding to the application classification folder in the direction opposite to the direction of the sliding operation, and the blank area being used as the push information area;

or, when the triggering operation is a click operation, pacing up in the application classification folder the information push interface corresponding to the application classification folder according to the click operation, and the blank area in the information push interface being used as the information push area.

Optionally, after acquiring one or more pieces of push information corresponding to the application in the application classification folder, the computer executable instructions, when executed, further implement the steps of:

displaying the prompt information of each piece of push information, such that the user performs the above triggering operation in the application classification folder.

Optionally, the computer executable instructions, when executed, further implement the steps of:

creating, in the application classification folder, a shortcut startup icon of the application service according to frequency of utilization corresponding to each application service provided by each application;

displaying the created shortcut startup icon in the application classification folder according to a high to low order of the weight corresponding to the application to which the created shortcut startup icon belongs.

Optionally, the computer executable instructions, when executed, further implement the steps of:

respectively detecting frequency of utilization of each application in the application classification folder, and moving out the icon of the application whose frequency of utilization is higher than a first predetermined frequency from the application classification folder to the desktop of the mobile terminal;

creating a shortcut startup icon for the application service whose frequency of utilization is higher than a second predetermined frequency in the moved-out application, and displaying the created shortcut start icon on the desktop of the mobile terminal.

It is clear that, by means of the apparatus in the embodiment of the present application, the information push area can be determined in the application classification folder to which the push information belongs according to the triggering operation of the user, and the push information of the application can be displayed in the information push area according to the weight of the application to which the push information belongs and the heat of the push information, thereby improving the efficiency of the user to quickly locate the push information to be viewed in multiple pieces of push information, facilitating the user to view the push information, thereby solving the problem of reducing the efficiency of the user to quickly locate the push information to be viewed in the plurality of push information in an information display manner of the prior art.

The information display apparatus provided by the embodiments of the present application can also perform the method performed by the information display apparatus in FIG. 1 to FIG. 10 and implement the functions of the information display apparatus in the embodiments shown in FIG. 1 to FIG. 10, which will not be described herein again.

The embodiments of the present application further provide a storage medium having computer programs stored thereon. The computer programs, when executed by the processor, implement various processes of the foregoing embodiments of the information display method, and can achieve the same technical effects. In order to avoid duplication, details are not described herein again. The above storage medium is a computer readable storage medium, such as a read-only memory (ROM), a random access memory (RAM), a magnetic disk, or an optical disk.

What is claimed is:

1. An information display method applied to a mobile terminal, comprising:

acquiring, respectively, a push information of each application in an application classification folder on a desktop of the mobile terminal, wherein the application classification folder is used to store an icon corresponding to the application of a predetermined category in the mobile terminal;

determining, respectively, according to a weight corresponding to the application to which each piece of the push information belongs and a heat corresponding to each piece of the push information, an arrangement order of each piece of the push information when displayed, wherein the weight corresponding to the application is respectively related to a usage information and a heat information corresponding to the application;

determining an information push area in the application classification folder according to a triggering operation after the triggering operation of a user in the application classification folder has been monitored; and displaying each piece of the push information in the information push area according to the determined arrangement order;

the information display method further comprising:

determining a usage sub-weight of the application according to a frequency of utilization and an installation duration in the usage information of the application, and a predetermined usage sub-weight determination rule; and determining a heat sub-weight of the application, according to a heat range in the heat information of the application and a mapping relationship between the heat range and the heat sub-weight; and performing, a weighted summation for the usage sub-weight and the heat sub-weight, respectively, to obtain the weight of the application.

2. The method according to claim 1, wherein determining, according to the weight corresponding to the application to which each piece of the push information belongs and the heat corresponding to each piece of the push information, the arrangement order of each piece of the push information when displayed, comprising:

respectively determining a display index of each piece of the push information according to the weight corresponding to the application to which each piece of the push information belongs, and the heat of each piece of the push information; and determining the arrangement order of each piece of the push information when displayed according to the display index of each piece of the push information;

wherein the display index is positively correlated with the weight of the application to which the push information belongs, and is positively correlated with the heat of the push information.

3. The method according to claim 1, wherein determining the information push area in the application classification folder according to the triggering operation comprises:

when the triggering operation is a sliding operation, correspondingly moving in the application classification folder all display elements according to a direction of the sliding operation; and generating in the application classification folder a blank area corresponding to the application classification folder in a direction opposite to the direction of the sliding operation, and the blank area being used as the push information area;

or, when the triggering operation is a click operation, popping up in the application classification folder an information push interface corresponding to the application classification folder according to the click operation, and a blank area in the information push interface being used as the information push area.

4. The method according to claim 3, after acquiring the push information corresponding to the application in the application classification folder, further comprising:

displaying a prompt information of each piece of the push information, such that the user performs the triggering operation in the application classification folder.

5. The method according to claim 1, further comprising:

creating, in the application classification folder, a shortcut startup icon of an application service according to a frequency of utilization corresponding to each application service provided by each application;

displaying the created shortcut startup icon in the application classification folder according to a high to low order of the weight corresponding to the application to which the created shortcut startup icon belongs.

6. The method according to claim 1, further comprising:

respectively detecting the frequency of utilization of each application in the application classification folder, and moving out the icon of the application whose frequency of utilization is higher than a first predetermined frequency from the application classification folder to the desktop of the mobile terminal;

creating the shortcut startup icon for the application service whose frequency of utilization is higher than a second predetermined frequency in the moved-out application, and displaying the created shortcut start icon on the desktop of the mobile terminal.

7. The method according to claim 1, wherein before acquiring, respectively, the push information of each application in the application classification folder on the desktop of the mobile terminal, comprising: determining the weight of each application and saving it in a memory;

in the step of according to the weight corresponding to the application to which each piece of the push information belongs and the heat corresponding to each piece of the push information, finding out the weight corresponding to the application to which the push information belongs from the memory.

8. The method according to claim 7, wherein in the process of acquiring the push information of the application in the application classification folder on the desktop of the mobile terminal, selecting, when multiple pieces of the same push information are obtained, the push information of the application with highest frequency of utilization.

9. The method according to claim 1, wherein after displaying each piece of the push information in the information push area, the method comprises:

closing the information push area after maintaining for a predetermined period of time;

or, closing, after receiving a sliding operation in a direction opposite to a direction of a sliding operation for determining the information push area, the information push area, and restoring all the display elements in the application classification folder to original positions;

or, closing, after receiving a next click operation, the information push area, and restoring all the display elements in the application classification folder to the original positions.

10. An information display device applied to a mobile terminal, comprising:

a memory;

a processor; and computer executable instructions stored on the memory and operative on the processor, wherein when the computer executable instructions are executed, the processor is configured to:

acquire, respectively, a push information of each application in an application classification folder on a desktop of the mobile terminal, wherein the application classification folder is used to store an icon corresponding to the application of a predetermined category in the mobile terminal;

determine, respectively, according to a weight corresponding to the application to which each piece of the push information belongs and a heat corresponding to each piece of the push information, an arrangement order of each piece of the push information when displayed; wherein the weight corresponding to the application is respectively related to a usage information and a heat information corresponding to the application;

determine an information push area in the application classification folder according to a triggering operation after the triggering operation of a user in the application classification folder has been monitored;

display each piece of the push information in the information push area according to the determined arrangement order;

determine a usage sub-weight of the application according to a frequency of utilization and an installation duration in the usage information of the application, and a predetermined usage sub-weight determination rule; and determine a heat sub-weight of the application according to a heat range in the heat information of the application, and a mapping relationship between the heat range and the heat sub-weight; and perform a weighted summation for the usage sub-weight and the heat sub-weight, respectively, to obtain the weight of the application.

11. The device according to claim 10, wherein determining, according to the weight corresponding to the application to which each piece of the push information belongs and the heat corresponding to each piece of the push information, the arrangement order of each piece of the push information when displayed, comprises:

respectively determining a display index of each piece of the push information according to the weight corresponding to the application to which each piece of the push information belongs, and the heat of each piece of the push information; and determining the arrangement order of each piece of the push information when displayed according to the display index of each piece of the push information;

wherein the display index is positively correlated with the weight corresponding to the application to which the push information belongs, and is positively correlated with the heat corresponding to the push information.

12. The device according to claim 10, wherein determining the information push area in the application classification folder according to the triggering operation comprises:

when the triggering operation is a sliding operation, correspondingly moving in the application classification folder all display elements according to a direction of the sliding operation; and generating in the application classification folder a blank area corresponding to the application classification folder in a direction opposite to the sliding operation direction, and the blank area is used as the push information area;

or, when the triggering operation is a click operation, popping up in the application classification folder an information push interface corresponding to the application classification folder according to the click operation, and the blank area in the information push interface is used as the information push area.

13. The device according to claim 12, wherein when the computer executable instructions are executed, the processor is further configured to:

display, after acquiring the push information corresponding to the application in the application classification folder, a prompt information corresponding to each piece of the push information, such that the user performs the triggering operation in the application classification folder.

14. The device according to claim 10, wherein when the computer executable instructions are executed, the processor is further configured to:

create, in the application classification folder, a shortcut startup icon of an application service according to a frequency of utilization corresponding to each application service provided by each application; and display the created shortcut startup icon in the application classification folder according to a high to low order of the weight, corresponding to the application to which the created shortcut startup icon belongs.

15. The device according to claim 10, wherein when the computer executable instructions are executed, the processor is further configured to:

respectively detect the frequency of utilization of each application in the application classification folder, and move out the icon of the application whose frequency of utilization is higher than a first predetermined frequency from the application classification folder to the desktop of the mobile terminal; and create the shortcut startup icon for the application service whose frequency of utilization is higher than a second predetermined frequency in the moved-out application, and display the created shortcut startup icon on the desktop of the mobile terminal.

16. An information display apparatus, comprising: a memory, a processor, and a computer program stored on the memory and operative on the processor, wherein the computer programs, when executed by the processor, implement the steps of the method according to claim 1.

17. A non-transitory storage medium having computer programs stored thereon, wherein the computer programs, when executed by the processor, implement the steps of the method according to claim 1.

\* \* \* \* \*